Oct. 23, 1923.
R. M. FOX
AUTOMOBILE FOOT STEERING DEVICE
Filed April 30, 1923
1,471,393
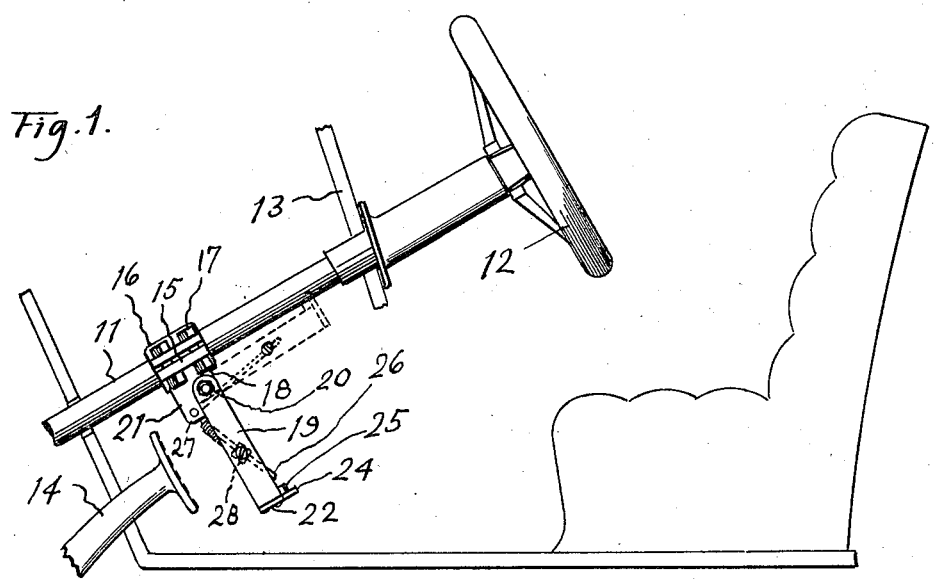
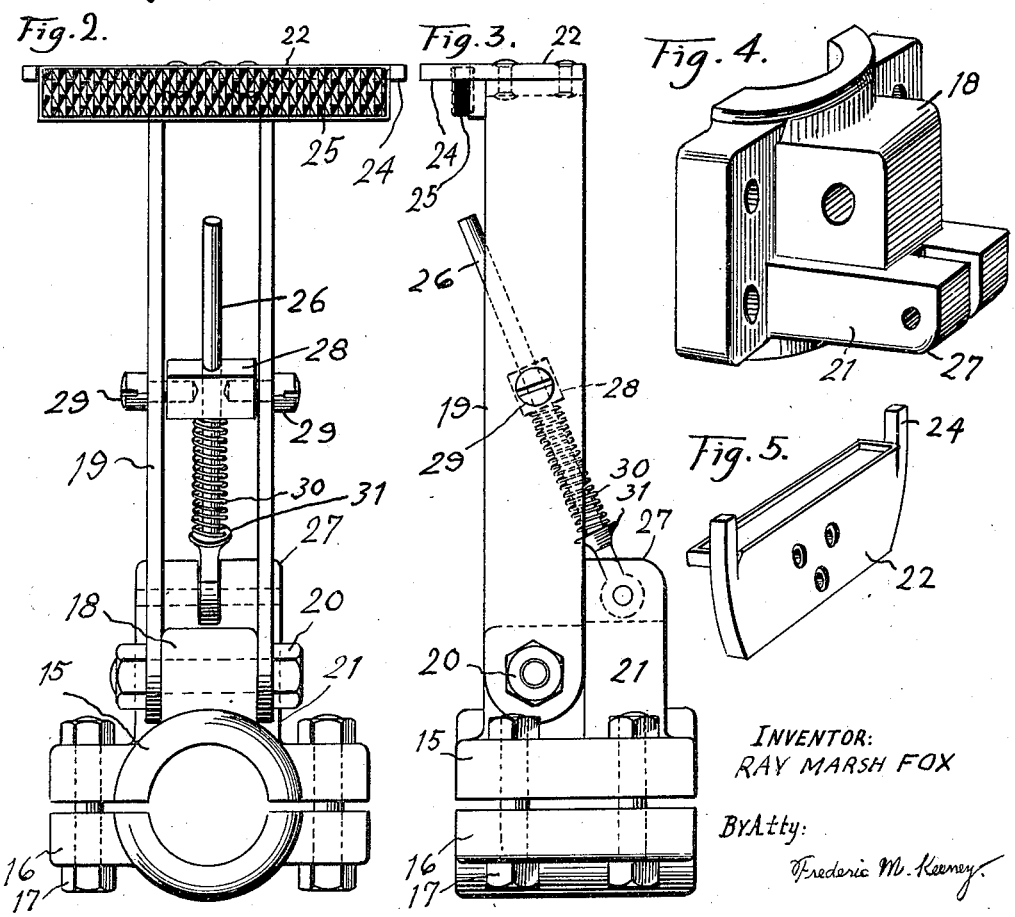
INVENTOR:
RAY MARSH FOX
BY Atty:
Frederic M. Keeney.

Patented Oct. 23, 1923.

1,471,393

UNITED STATES PATENT OFFICE.

RAY MARSH FOX, OF LOS ANGELES, CALIFORNIA.

AUTOMOBILE FOOT STEERING DEVICE.

Application filed April 30, 1923. Serial No. 635,607.

*To all whom it may concern:*

Be it known that I, RAY MARSH FOX, a citizen of the United States, residing in the city and county of Los Angeles and State of California, have invented a new and useful Automobile Foot Steering Device, of which the following is a specification.

This invention relates to an improved steering device for automobiles, and the object of the invention is to provide a device of this kind which can be quickly attached to the rotative shaft of the steering mechanism of an automobile, and which may be operated by the driver's foot, the device being intended for a limited and temporary control of the steering mechanism while the driver has taken his hands from the steering wheel.

Another object is to provide a device of this kind which will, when released by the driver, automatically return to its inoperative position, and out of the way relative to the control of the various foot levers provided for control of the automobile. The device is adapted, with minor modifications, to operate elevator mechanism, hand-operated brakes, and the rudders of boats and other vessels, and may be used in connection with other machines having steering gear; the device being adapted and designed to be used in any position in which a steering shaft is to be controlled in its rotary movement, and adapted particularly to automobile steering mechanism, so that the driver may for a limited time, use his hands for other purposes.

To the end stated, the invention consists in providing a steering lever, adapted to be secured to the rotary shaft of a steering mechanism, and provided with a spring mechanism to automatically return the lever to inoperative position when released by the foot of the operator.

This invention therefore consists in the construction, combination, and arrangement of parts hereinafter more fully described and specifically pointed out in the claims.

In the drawings: Figure 1 is a diagram showing my improved steering device in its relation to the steering mechanism of an automobile. Fig. 2 is a plan and detail view of the device in its operative position. Fig. 3 is a side view of the same. Fig. 4 is a perspective detail view of the clamp body of the device. Fig. 5 is a perspective detail view of the foot pedal adapted to be secured to the end of the operating lever.

In the present embodiment of the invention my improved foot-steering means for the steering gear is clamped to the rotary portion 11, of the steering mechanism of the automobile, and which is ordinarily operated by the hand-wheel 12. The steering means I have provided, is intended to be located beneath the portion 13, of the dash-board, on which the instruments are mounted, and in its operative position, is intended to extend in proximity to the automobile control foot-levers 14.

The clamping elements of my steering device consist of a main clamp body 15, and a clamp member 16, secured by bolts 17, to the rotary shaft 11, of the automobile. The main clamp body 15, is provided with a lug 18, to which a lever 19 is pivotally connected by a bolt 20. Beneath the lug 18 is an integral table 21 to support the lever in its operative position. A foot pedal 22, having side projections 24, and a rubber pad 25, is secured to the extremity of lever 19. A plunger 26, pivotally connected to the extremity 27, of table 21, slides through a transverse bar 28, pivotally mounted on trunnions 29. A spring 30 is interposed between bar 28, and an integral collar 31, on plunger 26.

In Figs. 1, 2 and 3, the device is shown in its operative position; the inoperative position being shown in dotted lines in Fig. 1. On release of the lever 19, the spring 30 forces the lever to inoperative position.

In operation, should the driver of the vehicle desire to use his hands for a purpose other than steering, he will manually force the lever 19 to operative position and engage the same with his foot. The vehicle may then be temporarily controlled by the foot of the operator, to travel in the desired direction. The lever 19 is automatically returned to inoperative position against the steering shaft, when released by the driver.

From the foregoing it will be seen that I have provided an exceedingly simple and effective foot-steering device for the steering gear of a motor vehicle, and that it will effectively prevent the vehicle from being accidentally deflected while the driver temporarily uses his hands for other purposes, or removes them from the steering wheel. Furthermore, the device may be used as a supplementary steering mechanism in connection with the manipulation of the steering wheel with the hands, thereby rendering the steering much easier when the automobile travels over rough roads.

While the preferred embodiment of the invention has been shown and described in detail, it will be understood that I do not limit the invention to the precise construction shown, since various changes in the form, proportion and arrangement of parts, and details of construction, may be resorted to within the spirit and scope of the invention.

What is claimed is:

1. The combination with a rotary element of a vehicle steering mechanism, of a clamp body attached thereto, a lever pivotally connected to the clamp body, a foot pedal on the extremity of the lever, a table integral with the clamp body and supporting the foot-lever in its operative position, and spring means to automatically return the lever to its inoperative position when released.

2. The combination with a rotary element of a steering mechanism, of a clamp body attached thereto, a steering lever pivotally connected to the clamp body and extending angularly from the rotary element in its operative position, said lever being maintained in operative position by the operator's foot, and means for returning the lever to inoperative position.

3. The combination with a rotary element of a vehicle steering mechanism, of a clamp body attached thereto, a lever pivotally connected to the clamp body, a foot pedal on the extremity of the lever, a table integral with the clamp body and supporting the lever in angular operative position relative to the rotary vehicle steering element, and a spring arranged to return the lever to its inoperative position.

4. The combination with a rotary element of a steering mechanism, of a clamp body attached thereto, a foot-lever pivotally connected to the clamp body, a foot pedal on the extremity of the foot-lever, a transverse bar pivotally mounted on the foot-lever, a table integral with the clamp body and supporting the foot-lever in its operative position, a plunger pivotally connected to the extremity of the table and sliding through the transverse bar in the foot lever, a collar integral with the plunger, and a spring interposed between the collar and the transverse bar and arranged to return the lever to its inoperative position.

5. The combination with a rotary element of a steering mechanism, of foot-actuated means attached thereto for controlling the rotary steering element, ant means for returning the foot-actuated means to its inoperative position when released.

6. The combination with a rotary element of a steering mechanism, of a foot-actuated means attached to the rotary element and maintained in its operative position by the foot, and serving to control the rotary steering element, and means for returning said controlling means to its inoperative position when released.

7. The combination with a rotary steering element, of a foot-actuated lever projecting angularly from and pivotally attached relative to the rotary steering element, and maintained in its operative position by the foot of the operator, and serving to control the rotary steering element, and spring actuated means for returning the lever to its inoperative position, said foot-lever folding against the rotary steering element in inoperative position.

8. The combination with a rotary steering element, of a foot-actuated lever arranged to control the rotary steering element in operative position, trunnion members mounted in the foot lever, a transverse bar pivotally mounted on the trunnion members, a table supporting the foot-lever in operative position, a plunger pivotally mounted relative to the table, a collar thereon, and a spring interposed between the collar and transverse bar.

9. The combination with a rotary steering element, and a clamp body rigidly mounted thereon, of a lug extending from the clamp body, a lever pivotally connected to said lug and adapted to be controlled, operated and maintained in operative position by the foot of the operator, a table integral with the clamp body and supporting the foot-lever in its operative position, said table extending angularly from the clamp body, opposed trunnion members in the foot lever, a transverse bar pivotally mounted on the trunnion members, a plunger pivotally connected relative to the extremity of the table, a collar integral with the plunger, and a spring interposed between the collar and said transverse bar.

In testimony whereof I hereunto affix my signature.

RAY MARSH FOX.